United States Patent [19]
Matsui

[11] Patent Number: 5,623,372
[45] Date of Patent: Apr. 22, 1997

[54] THIN TYPE OPTICAL HEAD

[75] Inventor: Tsutomu Matsui, Tokyo, Japan

[73] Assignee: NEC Corporation, Japan

[21] Appl. No.: 490,235

[22] Filed: Jun. 14, 1995

[30] Foreign Application Priority Data

Jun. 14, 1994 [JP] Japan ................................... 6-131515

[51] Int. Cl.$^6$ ........................................................ G02B 7/02
[52] U.S. Cl. ........................ 359/814; 359/813; 359/824; 369/44.15
[58] Field of Search .................................. 359/813, 814, 359/823, 824; 369/44.14, 44.15, 44.16

[56] References Cited

U.S. PATENT DOCUMENTS

| | | | |
|---|---|---|---|
| 4,607,913 | 8/1986 | Jansen | 359/814 |
| 4,798,447 | 1/1989 | Jansen et al. | 359/824 |
| 4,922,477 | 5/1990 | Miura | 359/814 |
| 5,124,965 | 6/1992 | Mizuno et al. | 369/44.14 |
| 5,150,343 | 9/1992 | Goto et al. | 359/824 |
| 5,267,229 | 11/1993 | Ikegame | 369/215 |
| 5,305,151 | 4/1994 | Kakimoto et al. | 359/814 |
| 5,319,624 | 6/1994 | Yamasaki et al. | 369/44.14 |
| 5,361,243 | 11/1994 | Kasahara | 369/44.15 |

FOREIGN PATENT DOCUMENTS 5274686  10/1993  Japan .

OTHER PUBLICATIONS

Shigeru Nakamura, et al., "*Stacked Optical Disk Drive for Multimedia Files*", JJpn. J. Appl. Phys., vol. 31 (1992) pp. 625–629, Part I, No. 2B, Feb. 1992.

Primary Examiner—Loha Ben
Attorney, Agent, or Firm—Ostrolenk, Faber, Gerb & Soffen, LLP

[57] ABSTRACT

An optical head has the structure that an optical system is mounted on a movable body and is separated from a fixed optical system with which the optical system cooperates and an objective lens actuator does not have the magnetic circuit on the movable body. The objective lens actuator is balanced so that the focusing drive point of the objective lens actuator corresponds to the gravity center thereof.

5 Claims, 6 Drawing Sheets

THIN TYPE OPTICAL HEAD

FIELD OF THE INVENTION

This invention relates to an optical head, and more particularly to, a thin type optical head for quickly accessing the inner radius to the outer radius of an optical disk such as a read-only disk, a rewritable disk and erasable disk.

BACKGROUND OF THE INVENTION

A peripheral memory device which has both rapidness in access of a magnetic disk and big capacity of memory of an optical disk has been developed. The next-generation disk devices must be optical disks since they have high-speed transfer and random access, big memory capacity, storage stability of medium and durability of medium due to non-contact drive. As an optical disk medium which is subjected to access from the inner to outer radius of the disk and in the opposite direction thereto, an erasable magneto-optical disk, or a phase transition disk is desirable.

A conventional optical head for accessing the optical disk is generally structured to pile up in the order of a linear motor generating a drive force to access inner to outer radii of the optical disk, a carriage driven to move in the direction, an optical system mounted on the carriage for projecting and receiving a beam to and from the optical disk, and an actuator for actuating an objective lens to adjust focussing and tracking on the optical disk. However, its structure was a big problem on performing high-speed access.

For providing an optical head with high-speed random access, high acceleration, etc. is required to move on the inner to outer radii of the disk at high speed. To increase acceleration, it is required to reduce the weight of the movable body as much as possible and to employ an electromagnetic drive by a magnetic circuit with high efficiency.

To obtain a thinner optical head, the conventional piled-up structure in which the linear motor, the carriage, the optical system and the objective lens actuator are piled up in that order may be replaced by a parallel structure as illustrated later. However, it is difficult to obtain a good movement or transfer performance by the latter structure, although it may be thin compared to the former. In the parallel structure, since the position of the objective lens holder is offset to the center of movement of the carriage, the signal reproduction ratio CNR is lowered due to the tendency in which the position of the objective lens holder may be inclined when the carriage moves. As a result, the optical head fails to correctly read an address signal from the disk.

The optical head in the parallel structure may be provided with two drive systems, one is a linear motor which has a big thrust to quickly drive from the inner to outer radius of the disk, the other is an actuator for tracking and focusing in which the order of ±0.1 μm is controlled for precise tracking on eccentricity of the disk. However, the trial which performs both integration of these two drive systems and thinner configuration generally has resulted in a complex structure and difficulty in assembly.

Furthermore, the optical head in the parallel structure may cause a failure in reading-out condition since the lens holder is inclined to the tangential direction by acceleration of the high-speed movement of both disk rotation and a linear motor when a lens holder for the actuator is not supported by rigid support members.

SUMMARY OF THE INVENTION

Accordingly, it is an object of the invention to provide a thin type optical head for quickly accessing the inner to outer radii of an optical disk.

It is a further object of the invention to provide a thin type optical head which has a good movement performance of transfer functions.

It is a still further object of the invention to provide a thin type optical head in which an actuator for an objective lens is rigidly supported not to cause a failure in reading-out conditions.

According to the invention, a thin type optical head, comprises:

a linear motor comprising an armature member and a stator member, the stator member being provided to extend between inner and outer radii of an optical disk, and the armature member moving on the stator member;

a carriage fixed to the armature member to move on the stator member;

a reflection mirror carried by the carriage, the reflection mirror receiving a collimated light from an externally provided optical system;

a lens holder for holding an objective lens, the lens holder being fixed to one ends of a plurality of wires to be arranged on one side of the carriage, other ends of the plurality of wires being fixed to the carriage, and the objecting lens focusing the collimated light reflected by the reflection mirror on the optical disk;

focusing and tracking coils fixed to the lens holder; and a magnetic circuit for generating a magnetic field acting on the focusing and tracking coils to correct focusing and tracking errors, the magnetic circuit being provided to extend between inner and outer radii of the disk.

BRIEF DESCRIPTION OF THE DRAWINGS

The invention will be explained in more detail in conjunction with the appended drawings, wherein.

DESCRIPTION OF THE PREFERRED EMBODIMENTS

Before explaining a thin type optical head in a preferred embodiment, the aforementioned conventional optical heads will be explained in FIGS. 1A and 1B.

Figures 1A, 1B:
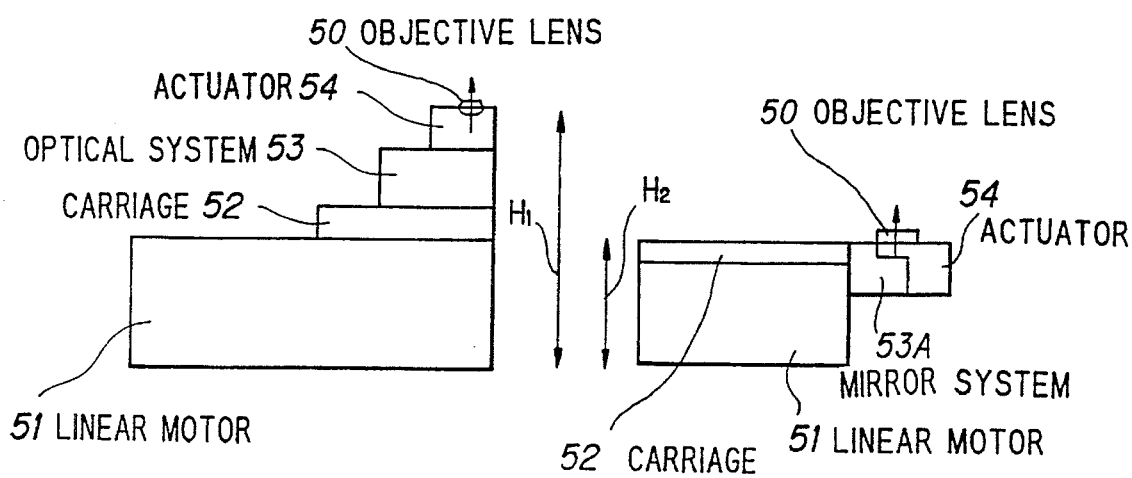
FIGS. 1A and 1B are explanatory diagrams showing conventional optical heads.
Figure 2A:
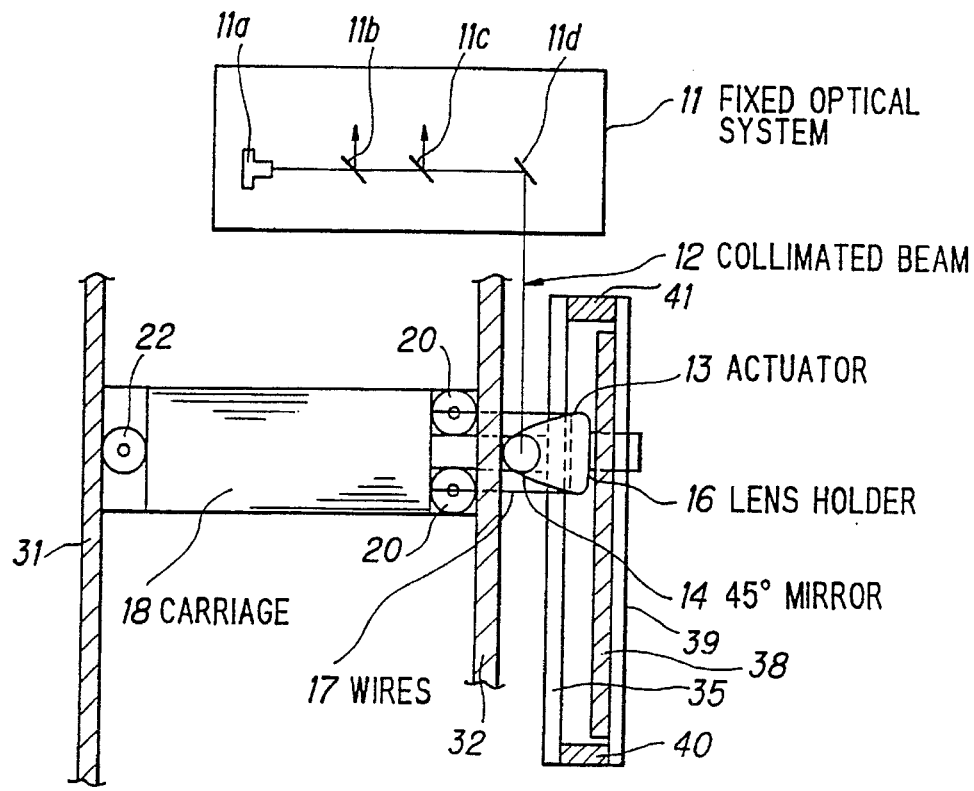
FIG. 2A is a top plane view showing an optical head in a preferred embodiment according to the invention.
Figure 2B:
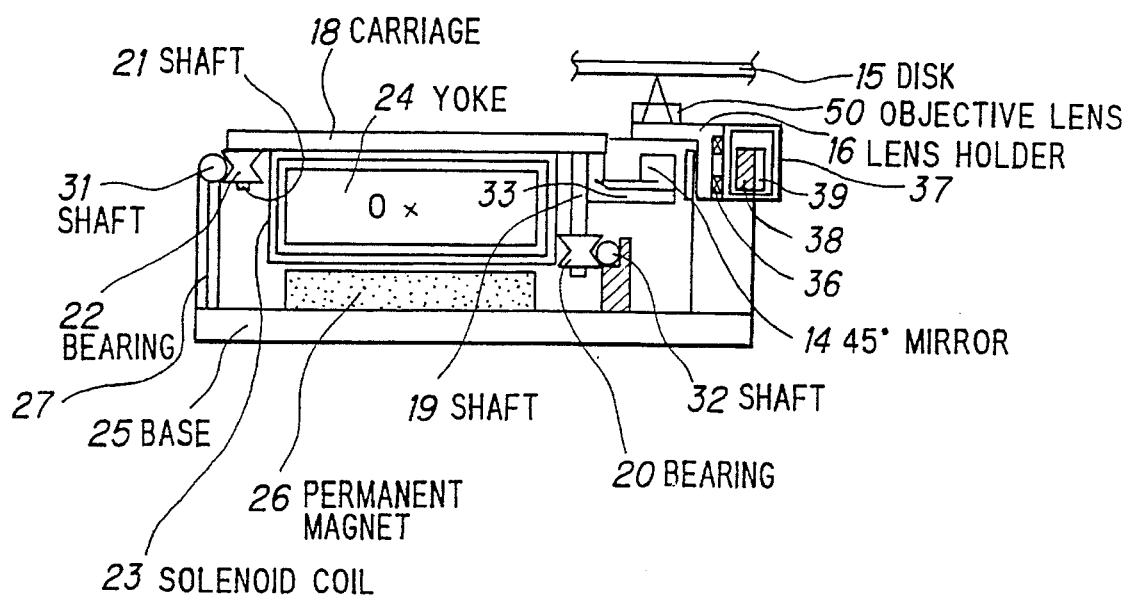
FIG. 2B is a cross sectional view cut along the line A—A in FIG. 2A.
Figure 3:
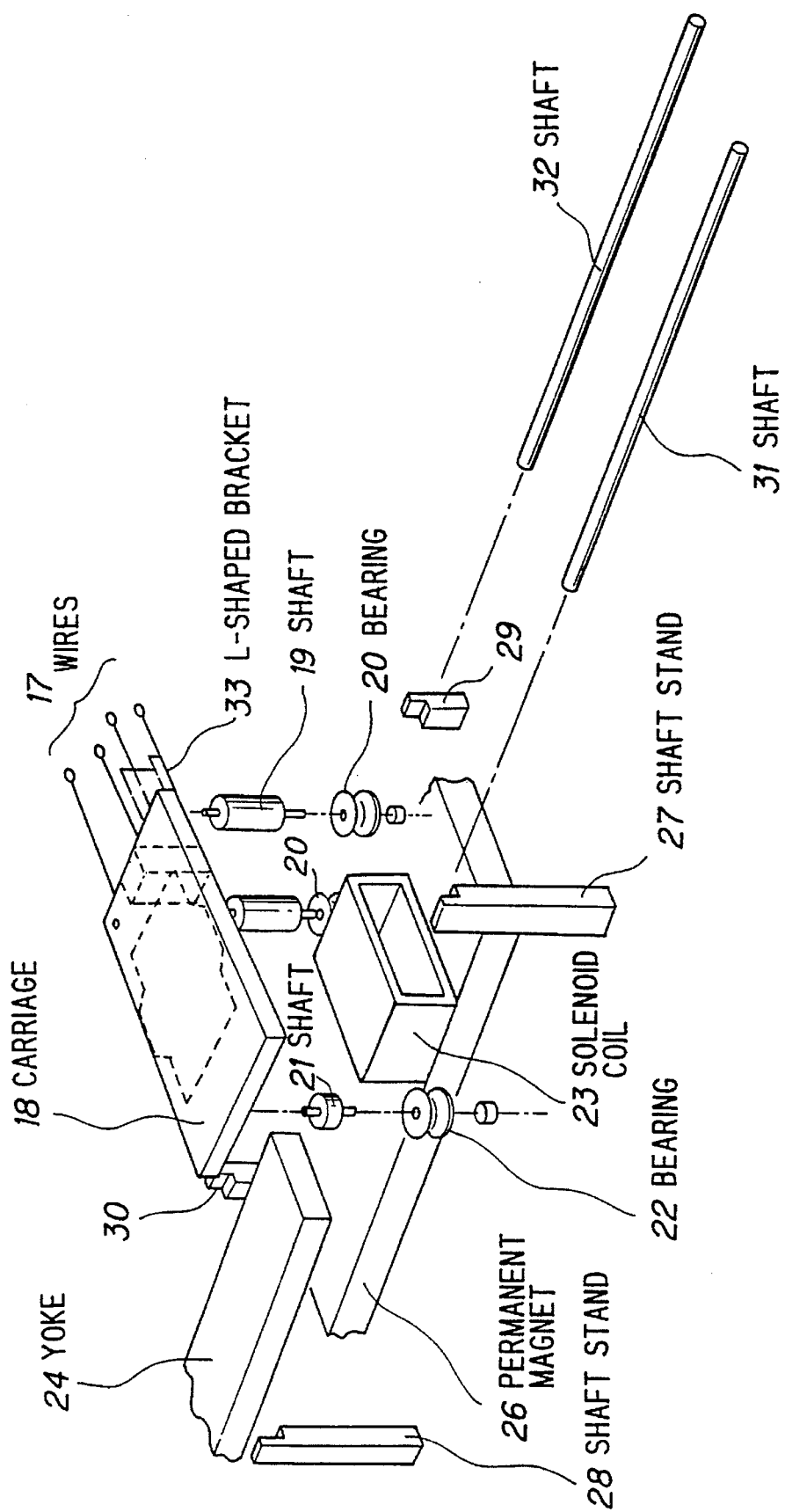
FIG. 3 is a perspective broken-up view showing parts of a carriage and a linear motor in FIGS. 2A and 2B.
Figure 4A:
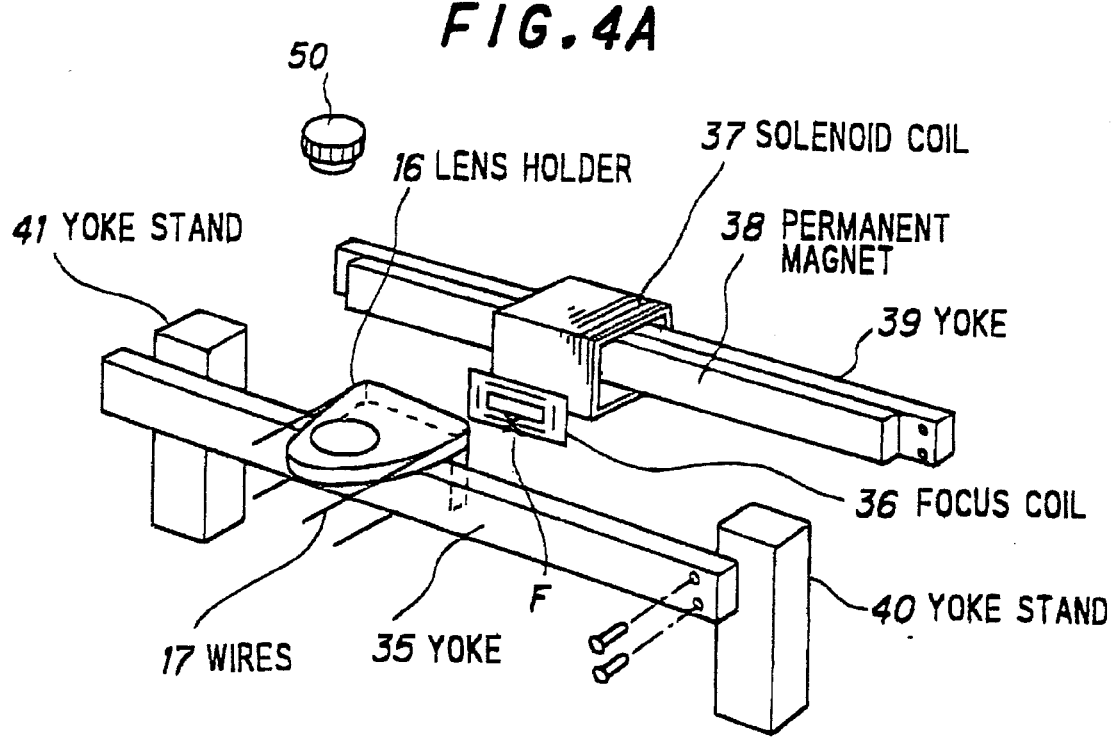
FIG. 4A is a perspective view showing the part of a magnetic circuit for an objective lens actuator in FIG. 2A and 2B.
Figure 4B:
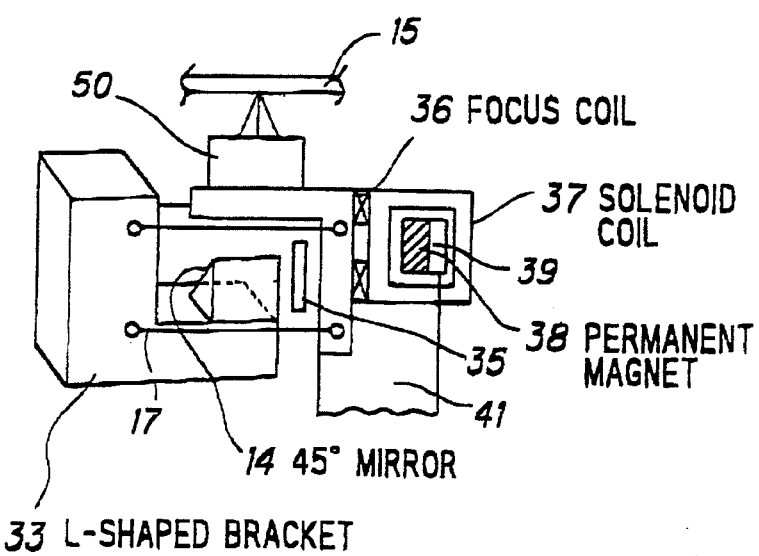
FIG. 4B is a perspective view showing a optical system in the optical head in FIGS. 2A and 2B including a partly sectional view of the magnetic circuit in FIG. 4A.

In FIG. 1A, the conventional piled-up type optical head comprises a linear motor 51 for generating a driving force to access inner to outer radii of an optical disk, a carriage 52 driven to move in the direction, an optical system 53 mounted on the carriage 52 for projecting and receiving a beam to and from the optical disk, and an actuator 54 for actuating an objective lens to adjust focussing and tracking on the optical disk. As illustrated therein, the linear motor 51, the carriage 52, the optical system 53 and the objective lens actuator 54 are piled up in that order.

On the other hand, FIG. 1B shows the conventional parallel type optical head which comprises a linear motor 51, a carriage 52, a mirror system (reflection mirror) 53A, an actuator 54, and an objective lens 50 held by a lens holder (not shown), wherein the actuator 54 and the objective lens 50 are arranged on the side of the carriage 52 to lower the height $H_1$ to $H_2$ compared to the piled-up type optical head.

In the parallel type optical head, however, there is a disadvantage in that a movement property (transfer property) is deteriorated due to the structure in which the lens holder and the actuator 54 are heavy and off the center of the movement of the carriage 52. This results in the deterioration of a signal reproduction ratio CNR due to the inclination of the lens holder, thereby making it impossible to read address signal from a disk.

Next, a thin type optical head in the preferred embodiment will be explained in FIGS. 2 to 5.

FIGS. 2A and 2B, FIG. 3 and FIGS. 4A and 4B show a thin type optical head drive assembly for accessing the inner and outer radii of a disk 15. Collimated beam 12 projected from an externally fixed optical system 11 including a light source 11a, beam splitter 11b and 11c, and a reflection mirror 11d reaches a 45 degree inclined mirror 14 below an objective lens holder 16 and is reflected by 90 degrees thereat to be focused at the surface of the disk 15 by an objective lens 50. A focus coil 36 in the rectangular form and a tracking coil 37 in the solenoid form are provided for the lens holder 16 which has a cross section of about L letter. The lens holder 16 is supported by four wires 17 fixed to a L-shaped bracket 33 supported by a carriage 18 which moves between inner and outer radii. The carriage 18 is preferred to be arranged that the central point O of a line between a V-shaped bearing 20 which is rotated on a long shaft 19 and a V-shaped bearing 22 which is rotated on short shaft 21 coincides to the drive center of the linear motor.

In the linear motor, a rectangular solenoid coil 23 is fixed to the carriage 18, and a yoke 24 is inserted into the coil 23, while a permanent magnet 26 is provided on a base plate 25. Two pairs of long shaft stands 27, 28 and short shaft stands 29, 30 are stood on the base plate 25 to support shafts 31, 32. Furthermore, yoke stands 41 and 42 for a magnetic circuit (described below) which drives the lens holder 16 is also stood on the base plate 25.

The coil 23 is fixed at the central part of the carriage 18, and the long shafts 19 fitted with the V-shaped bearing 20 and the short shaft 21 fitted with the V-shaped bearing 22 are fixed at the edge part of the carriage 18. The L-shaped angle bracket 33 fitted with a 45 degree mirror 14 which cooperates with the externally fixed optical system 11 is fixed between the shafts 19 under the carriage 18. Four wires 17 are attached to the bracket 33 and support the lens holder 16.

Four wires 17 extend from the lens holder 16 which has about L-shape in the cross section, and a magnetic yoke 35 is supported between upper and lower wires 17 by the yoke stands 40 and 41. A focus coil 36 is stuck to the back surface of the lens holder 16, a rectangular solenoid coil 37 for providing a tracking drive force is stuck thereon. A yoke 39 attached with a magnet 38 is inserted into the rectangular solenoid coil 37 and is supported by yoke stands 40 and 41. The magnetic circuit is formed of the yoke 35 and the magnet 38 attached to the yoke 39, and the lens holder is driven by the focus coil 36 and the tracking coil 37 stuck to it.

Figure 5A:
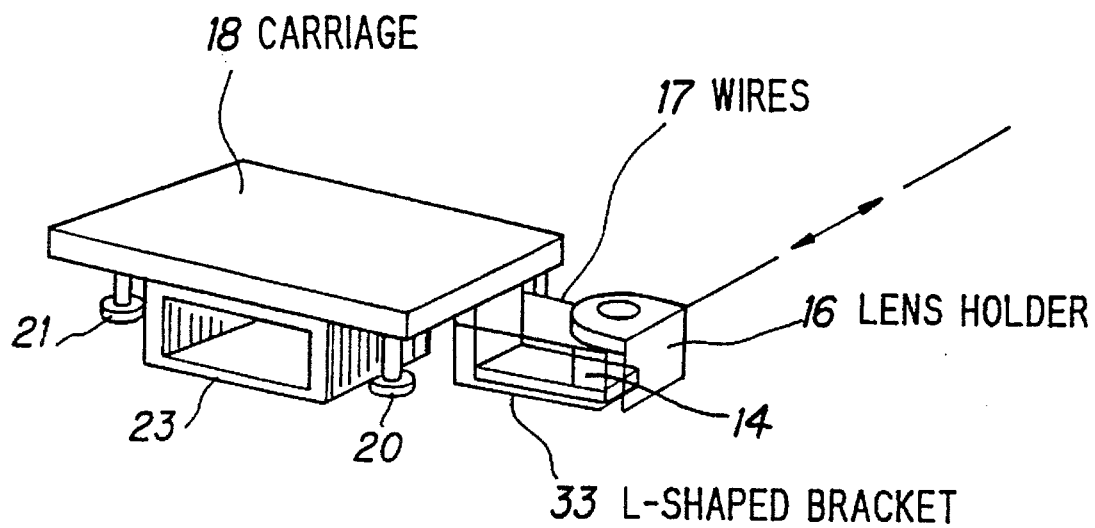
FIG. 5A is a perspective view showing the optical system in the optical head in FIGS. 2A and 2B.
Figure 5B:
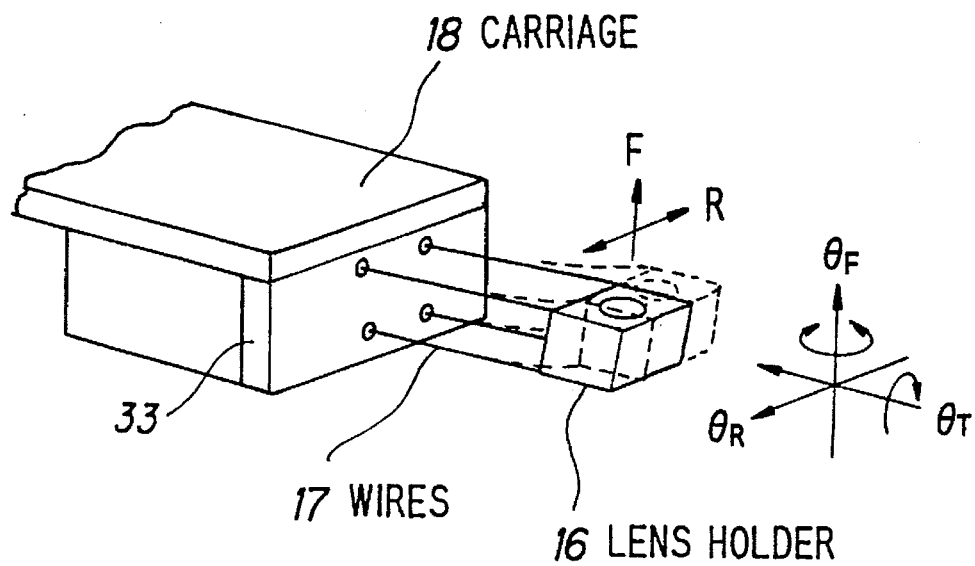
FIG. 5B is a conceptional view showing the movement of the objective lens against the carriage at high-speed access.

In FIG. 5A, the carriage 18 is attached with the L-shaped bracket 33 having the 45 degree mirror 14. Four wires 17 extending from the L-shaped bracket 33 support the lens holder 16. FIG. 5B shows that the four wires 17 are transformed by the inertial force when the carriage 18 moves. From this, it is seen that the lens holder 16 is inclined to the direction as rotated around the focus axis ($\theta_F$), not to the direction as rotated along the tangent line of the disk. Therefore, it will be understood that the rotation inclination along the tangent line ($\theta_T$) of the disk which may influence the focus property of the focused beam with causing the offset of the center of the objective lens from the center of the carriage is reduced.

Figure 6:
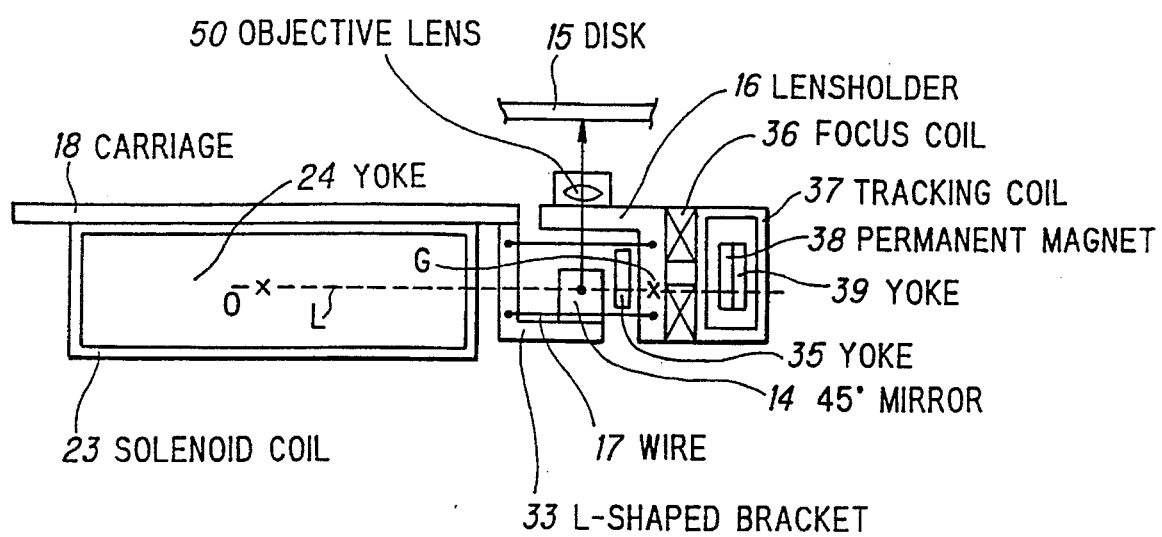
FIG. 6 is an explanatory view showing the feature of an optical head in the invention.

In FIG. 6, the feature of the invention will be again explained, wherein like parts are indicated by like reference numerals as used in FIGS. 2A and 2B to FIGS. 5A and 5B.

As clearly shown therein, the drive center of the linear motor (one of elements being the solenoid coil 23) is indicated by the letter "O", and the gravity center of the lens holder 16 fixed with the focus coil 36 and the tracking coil 37 is indicated by the letter G. In addition, it is designed that a focus drive point of the focus coil 36 is on the line "L" connecting the drive center "O" and the gravity center "G". Consequently, the advantage as described above is obtained in the invention.

As described above, the invention can provide the optical head which is compact and light to quickly access the inner to outer radii of the optical disk. In particular, the optical head has the structure in which an optical system is externally provided, and the actuator does not include the magnetic circuit as a movable body. As a result, the weight of the movable body is highly reduced to provide an optical head with quick access and thin structure.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A thin type optical head, comprising:

a linear motor including an armature member and a stator member, said stator member being provided to extend between inner and outer radii of an optical disk, and said armature member moving on said stator member;

a carriage fixed to said armature member to move on said stator member;

a reflection mirror carried by said carriage, said reflection mirror receiving a collimated light from an externally provided optical system;

a lens holder for holding an objective lens, said lens holder being fixed to one ends of a plurality of wires to be arranged on one side of said carriage, other ends of said plurality of wires being fixed to said carriage, and said objective lens focusing said collimated light reflected by said reflection mirror on said optical disk;

focusing and tracking coils fixed to said lens holder; and a magnetic circuit for generating a magnetic field acting on said focusing and tracking coils to correct focusing and tracking errors, said magnetic circuit being provided to extend between inner and outer radii of said disk;

said armature member of said linear motor including a solenoid coil;

said carriage including a L-shaped bracket having a vertical downward portion and a horizontal portion, said vertical downward portion fixing said other ends of said plurality of wires, and said horizontal portion mounting said reflection mirror thereon;

said focusing and tracking coils are rectangular and solenoid coils, respectively; and said magnetic circuit including first and second elongated yokes, and a permanent magnet fixed on said first elongated yoke.

2. The optical head as defined in claim 1, wherein:

said solenoid coil for said tracking coil has a bore through which said first yoke fixed with said permanent magnet is provided to extend.

3. The optical head as defined in claim 1, wherein:

said plurality of wires are four in number.

4. A thin type optical head, comprising:

a linear motor including an armature member and a stator member, said stator member being provided to extend between inner and outer radii of an optical disk, and said armature member moving on said stator member;

a carriage fixed to said armature member to move on said stator member;

a reflection mirror carried by said carriage, said reflection mirror receiving a collimated light from an externally provided optical system;

a lens holder for holding an objective lens, said lens holder being fixed to one ends of a plurality of wires to be arranged on one side of said carriage, other ends of said plurality of wires being fixed to said carriage, and said objective lens focusing said collimated light reflected by said reflection mirror on said optical disk;

focusing and tracking coils fixed to said lens holder; and a magnetic circuit for generating a magnetic field acting on said focusing and tracking coils to correct focusing and tracking errors, said magnetic circuit being provided to extend between inner and outer radii of said disk;

wherein a drive center of said linear motor, a gravity center of said lens holder fixed with said focusing and tracking coils, and a focus drive point of said focusing coil are positioned on a common horizontal line.

5. The optical head as defined in claim 4, wherein:

said armature member of said linear motor is supported by first and second bearings, said first bearing being positioned on an upper and first side of said armature member, while said second bearing being positioned on a lower and second side of said armature member, and said drive center of said linear motor being positioned on a center of a line connecting said first and second bearings.

* * * * *